(12) United States Patent
Ikeda et al.

(10) Patent No.: US 8,103,963 B2
(45) Date of Patent: Jan. 24, 2012

(54) GRAPHICAL USER INTERFACE, DISPLAY CONTROL DEVICE, DISPLAY METHOD, AND PROGRAM

(75) Inventors: Takuo Ikeda, Tokyo (JP); Hidenori Karasawa, Tokyo (JP); Kazuto Mugura, Tokyo (JP); Mayu Irimajiri, Tokyo (JP); Shinji Kimura, Tokyo (JP); Yoshiyasu Kubota, Kanagawa (JP); Takashi Kitao, Tokyo (JP); Shogo Sato, Saitama (JP); Dan Li, Tokyo (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 12/191,640

(22) Filed: Aug. 14, 2008

(65) Prior Publication Data
US 2009/0051703 A1    Feb. 26, 2009

(30) Foreign Application Priority Data

Aug. 15, 2007    (JP) .............................. P2007-211945

(51) Int. Cl.
  *G06F 3/048*    (2006.01)
  *G06F 7/00*    (2006.01)
(52) U.S. Cl. ........ 715/764; 715/810; 715/853; 715/854; 707/722; 707/705
(58) Field of Classification Search .................. 715/810, 715/764, 853; 707/722, 705
  See application file for complete search history.

(56) References Cited

U.S. PATENT DOCUMENTS

| | | | |
|---|---|---|---|
| 7,730,012 B2 * | 6/2010 | Arrouye et al. ........................ 1/1 |
| 7,752,565 B2 * | 7/2010 | Bombolowsky et al. ...... 715/766 |
| 2004/0056903 A1 * | 3/2004 | Sakai ............................. 345/853 |
| 2005/0210410 A1 * | 9/2005 | Ohwa et al. .................... 715/821 |
| 2006/0155757 A1 * | 7/2006 | Williams et al. .......... 707/103 R |
| 2006/0228096 A1 * | 10/2006 | Hoshino et al. .................. 386/46 |
| 2007/0016871 A1 * | 1/2007 | Magnifico ...................... 715/764 |
| 2008/0126979 A1 * | 5/2008 | Abe et al. ....................... 715/781 |

OTHER PUBLICATIONS

Microsoft® Office® Outlook, copyright 2003 (see attached screenshots).*
U.S. Appl. No. 12/190,978, filed Aug. 13, 2008, Ishihara, et al.

* cited by examiner

*Primary Examiner* — Ting Lee
(74) *Attorney, Agent, or Firm* — Oblon, Spivak, McClelland, Maier & Neustadt, L.L.P.

(57) ABSTRACT

There is provided a graphical user interface that is displayed within one screen of a display device. The graphical user interface includes a matrix-shaped display area that is partitioned along a first axis by types of content and partitioned along a second axis by units of time. Items of information on the content that is processed within a specified unit of time are displayed within the matrix-shaped display area, closed together along the second axis.

11 Claims, 6 Drawing Sheets

GRAPHICAL USER INTERFACE, DISPLAY CONTROL DEVICE, DISPLAY METHOD, AND PROGRAM

CROSS REFERENCES TO RELATED APPLICATIONS

The present invention contains subjected matter related to Japanese Patent Application JP 2007-211945 filed in the Japan Patent Office on Aug. 15, 2007, the entire contents of which being incorporated herein by reference.

BACKGROUND OF THE INVENTION

1. Field of the Invention

The present invention relates to a graphical user interface, a display control device, a display method, and a program.

2. Description of the Related Art

In recent years, as information processing technologies have become more advanced, a variety of functions have been incorporated into small devices such as mobile telephones, game devices, and the like. In addition to communication functions and telephony functions, these devices are now equipped with a wide range of functions such as electronic mail functions, photography functions, schedule management functions, and the like. In order to use the various functions, a user of one of these devices launches an application that corresponds to a desired function. For example, a user who uses an e-mail function launches an e-mail application. Then the user creates an e-mail and transmits the created e-mail. In a case where the user, while using one function, decides to use another function, the user launches a separate application that corresponds to the other function. Furthermore, in a case where the user decides to use different content in the same application, the user first returns to a menu screen, then switches to a screen for selecting the desired content. This causes the user to work through an excessive number of steps.

In a case where the user uses an information processing device that is equipped with a large display device, the user can have a plurality of applications running at the same time and can switch between the applications and between the content to use them. This makes it possible to omit steps by the user. However, in a case where the user uses a device that is equipped with only a small display device, the small display causes the user to work through the steps described above, which diminishes the device's convenience for the user.

Reasons that the user might use a plurality of functions concurrently include, for example, a desire to know a temporal or spatial relationship between information in an e-mail that is transmitted or received by an e-mail function and information in a photograph that is taken by a photography function. In other cases, the user might want to know statistical information pertaining to content that was acquired or provided in the past or want to know a relationship between that statistical information and information on other content.

For example, in Japanese Patent Application Publication No. JP-A-2005-135401, a mobile terminal device is disclosed that can display, in chronological order, a list of e-mails the user has transmitted and e-mails the user has received. By displaying the list that contains both the transmitted e-mails and the received e-mails, the device makes it possible for the user to see at a glance the flow of an exchange with a single correspondent.

SUMMARY OF THE INVENTION

The device described above provides an advantage in that it makes it possible to see transmitted and received e-mails at a glance based on information on the correspondent. However, the device does not show to the user a relationship between the e-mail function and another function. Therefore, when the user wants to extract a desired photograph based on e-mail time information, for example, the user searches the desired photograph by first storing or making a note of the e-mail time information, then compare the e-mail time information to time information that is displayed on a photography application screen. Accordingly, a display method is required that is capable of defining the time information as key information and comparing a plurality of types of data to the key information. A graphical user interface is also required to implement the display method.

Accordingly, the present invention addresses these issues and provides a graphical user interface, a display control device, a display method, and a program that are new and improved and that are capable of displaying a plurality of types of related data for which the time information serves as key information and indicating the relatedness of the data.

In order to address the issues described above, according to an embodiment of the present invention, there is provided a graphical user interface that is displayed within one screen of a display device. The graphical user interface includes a matrix-shaped display area that is partitioned along a first axis by types of content and partitioned along a second axis by units of time. Items of information on the content that is processed within a specified unit of time are displayed within the matrix-shaped display area, closed together along the second axis.

The graphical user interface may also include a detail display area that one of partially overlaps and entirely overlaps the matrix-shaped display area and in which comparatively detailed information is displayed that pertains to content that is selected within the matrix-shaped display area.

In the graphical user interface, the matrix-shaped display area and the detail display area may also be displayed in different display formats, such that the matrix-shaped display area and the detail display area can be visually differentiated and recognized.

In the graphical user interface, the matrix-shaped display area may also be displayed in a three-dimensional display format, and the detail display area may also be displayed in a two-dimensional display format.

Further, in the graphical user interface, in a case where specified key information is selected from within the comparatively detailed information that is displayed in the detail display area, information on the content that corresponds to the selected key information may be displayed mainly in the matrix-shaped display area.

In addition, in the graphical user interface, in a case where specified key information is selected from within the comparatively detailed information that is displayed in the detail display area, information on the content that corresponds to the selected key information may be displayed in a highlighted form in the matrix-shaped display area.

Furthermore, in the graphical user interface, in a case where specified key information is selected from within the comparatively detailed information that is displayed in the detail display area, numbers of items of the content that corresponds to the selected key information may be displayed in the detail display area, partitioned by the types of the content.

The graphical user interface may also include a mark information display area in which is displayed a specified mark information item that is affixed to the information on the content. The mark information item that is displayed in the mark information display area may be selected and affixed to an item of the comparatively detailed information that is displayed in the detail display area. In a case where a mark information item is selected from within the comparatively detailed information that is displayed in the detail display area, only content information to which a mark information item is affixed that is the same as the selected mark information item may be displayed in the matrix-shaped display area.

The graphical user interface may also include a mark information display area in which is displayed a specified mark information item that is affixed to the information on the content. The mark information item that is displayed in the mark information display area may be selected and affixed to an item of the comparatively detailed information that is displayed in the detail display area. In a case where a mark information item is selected from within the comparatively detailed information that is displayed in the detail display area, content information to which a mark information item is affixed that is the same as the selected mark information item may be displayed in the matrix-shaped display area.

In order to address the issues described above, according to another embodiment of the present invention, there is provided a display control device for displaying the graphical user interface on a display device. The display control device includes a display control portion that displays items of information on the content on the display device, closed together along the second axis.

In order to address the issues described above, according to another embodiment of the present invention, there is provided a display method the displays the graphical user interface on a display device. The display method includes a step of displaying, on the display device, items of information on the content that is displayed in the matrix-shaped display area, closed together along the second axis.

In order to address the issues described above, according to another embodiment of the present invention, there is provided a program that causes a computer to fulfill the functions of the display control device. A storage medium is also provided in which the program is stored.

According to the embodiments of the present invention described above, it is possible to display a plurality of types of related data for which time information serves as a key and to indicate the relatedness of the plurality of types of data.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiment

An embodiment according to the present invention will be explained in detail below. The present embodiment relates to a technology that provides a graphical user interface that is capable of making a user aware of relatedness among a plurality of types of content, based on time information that is included in the content. First, a configuration of a display system 1000 that is capable of providing the graphical user interface will be explained. Then specific examples of configurations of the graphical user interface according to the present embodiment will be shown, along with modified examples.

Configuration of Display System 1000

Figure 1:
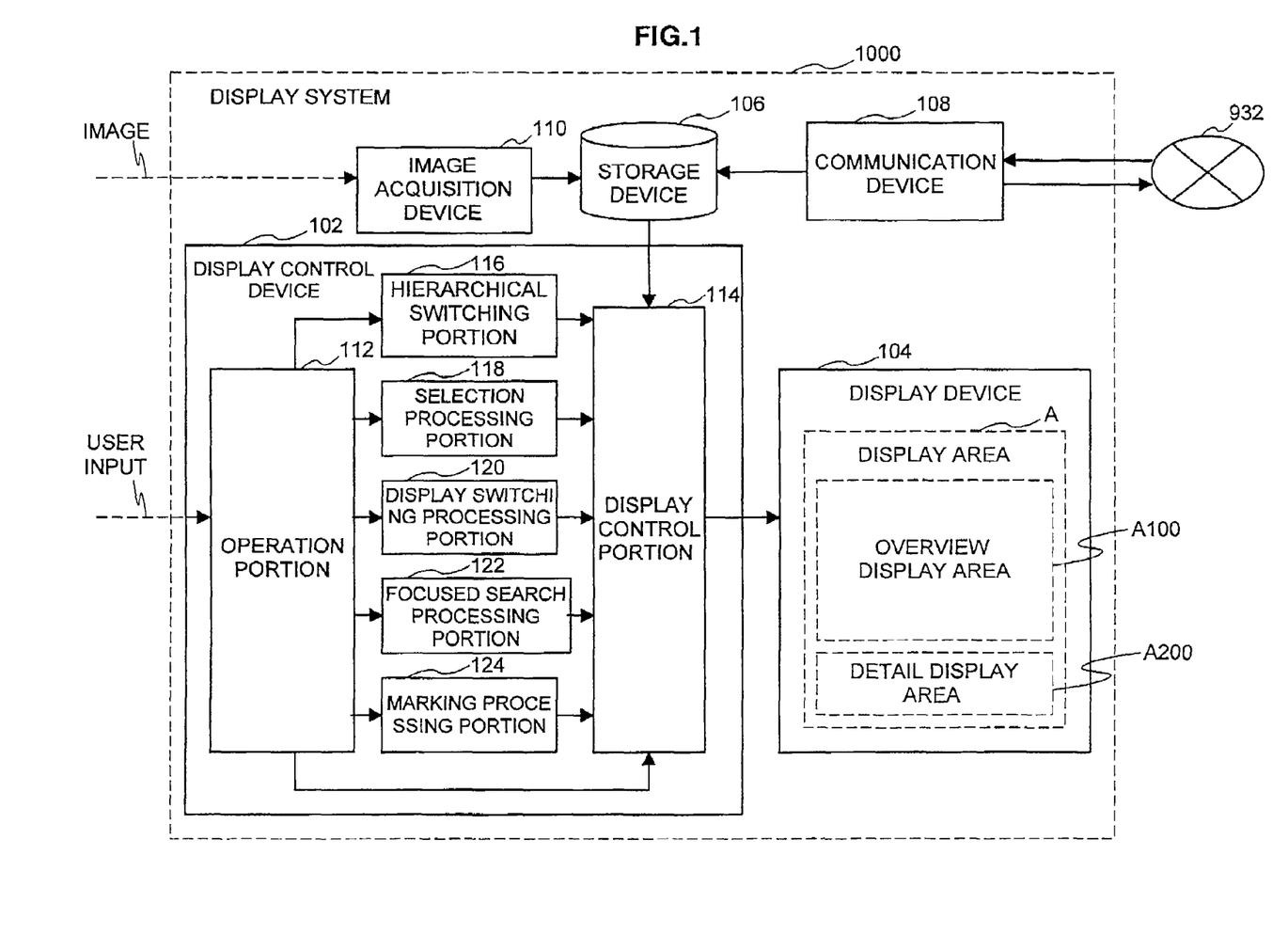
FIG. 1 is an explanatory figure that shows a configuration of a display system according to an embodiment of the present invention.

First, the configuration of the display system 1000 according to the present embodiment will be explained briefly with reference to FIG. 1. FIG. 1 is an explanatory figure that shows the configuration of the display system 1000 according to the present embodiment.

As shown in FIG. 1, the display system 1000 is mainly configured from a display control device 102, a display device 104, a storage device 106, a communication device 108, and an image acquisition device 110.

The display control device 102 performs processing related to display control for the graphical user interface, which is displayed on the display device 104. The display device 104 is controlled by the display control device 102 and displays the graphical user interface. A display screen on the display device 104 includes a display area A, in which the graphical user interface is displayed. The display area A includes an overview display area A100 and a detail display area A200. Note that the overview display area A100 and the detail display area A200 may be displayed such that they overlap.

The storage device 106 stores, one of temporarily and permanently, e-mail that is transmitted and received through the communication device 108, still images and moving images (hereinafter called "image data") that are acquired through the image acquisition device 110, and user schedule information, audio data, and Web content, broadcast content, and the like that is acquired through a network 932. The communication device 108 is a communication section that is one of wired and wireless, and it can acquire and provide information through the network 932, which is one of a local area network and a wide area network. The communication device 108 may also be a telephony section, and it may have functions that acquire telephony information such as a calling record, a calling history, and the like and that store the telephony information in the storage device 106. The image acquisition device 110 is an image acquisition section for optically acquiring an image of a subject and storing the image as image data. Note that the image acquisition device 110 may also be a section that acquires audio data as it acquires the image data.

As explained above, the display system 1000 is a system that acquires the content using various types of methods and provides the content it has acquired to a user by displaying the content on the display device 104. For example, it is possible to use one of some and all of the configuring elements of the display system 1000 to configure an information processing terminal such as a mobile device, a mobile telephone, or the like. A functional configuration of the display control device 102 will be explained below in relation to the graphical user interface that is displayed on the display device 104 by the display control device 102. Thereafter, specific examples of configurations of the graphical user interface that is displayed on the display device 104 will be explained.

Functional Configuration of the Display Control Device 102

The functional configuration of the display control device 102 according to the present embodiment will be explained with reference to FIG. 1.

As shown in FIG. 1, the display control device 102 is mainly configured from an operation portion 112, a display control portion 114, a hierarchical switching portion 116, a selection processing portion 118, a display switching processing portion 120, a focused search processing portion 122, and a marking processing portion 124.

The operation portion 112 is an operation section for receiving an input of information from the user. The display control portion 114 displays the graphical user interface on the display device 104 based on information on the content that is stored in the storage device 106. The display control portion 114 also performs display control processing that moves objects that are displayed in the graphical user interface, switches the display, and the like.

When the hierarchical switching portion 116 receives, through the operation portion 112, a command to shift a display level, the hierarchical switching portion 116 issues a command to the display control portion 114 to switch the display level in the graphical user interface, which is hierarchically arranged by a specified unit of time. When the selection processing portion 118 receives, through the operation portion 112, a command to select one of a specified object and a specified display area, the selection processing portion 118 issues to the display control portion 114 one of a command to shift a focus to one of the object and the display area that are displayed in the graphical user interface and a command to select the object.

When the display switching processing portion 120 receives, through the operation portion 112, a command to switch a display format, the display switching processing portion 120 issues to the display control portion 114 a command to switch the display format of the graphical user interface. The focused search processing portion 122 performs a focused search, based on key information that is input to the operation portion 112, and issues to the display control portion 114 a command to display a result of the search clearly in the graphical user interface. When the marking processing portion 124 receives a command through the operation portion 112, the marking processing portion 124 issues to the display control portion 114 a command to append specified mark information to a specified item of the content.

The functional configuration of the display control device 102 according to the present embodiment has been explained. The functions of the individual configuring elements described above are used to implement the graphical user interface according to the present embodiment.

Examples of Configurations of the Graphical User Interface

Specific examples of configurations of the graphical user interface according to the present embodiment will be explained with reference to FIGS. 2 to 5. FIGS. 2 to 5 are explanatory figures that show examples the configurations of the graphical user interface according to the present embodiment.

Basic Display Configuration

First, a basic display configuration of the graphical user interface according to the present embodiment will be explained with reference to FIG. 2. 104(A) is an example of a display configuration for displaying the information on the content by the month. 104(B) is an example of a display configuration for displaying the information on the content by the day. Note that where the term "processing" is used in the explanation that follows, it means an operation such as transmitting, receiving, and subscribing to e-mail, acquiring and viewing image data, acquiring and playing back audio data, acquiring and playing back calling records and calling histories, and processing a registered schedule or the like.

Display by the Month

First, the display configuration by the month, indicated by 104(A) in FIG. 2, will be explained. As shown in 104(A) in FIG. 2, the overview display area A100 and the detail display area A200 are displayed on the display device 104.

The Overview Display Area A100

Type display objects A102 that indicate types of the content are displayed in the overview display area A100. Further, a plurality of content objects A104 are displayed in the overview display area A100 below the type display objects A102. The content objects A104 are one of content items and information on the content that are stored in the storage device 106. For example, one of the content objects A104 that is displayed below the type display object A102 that indicates e-mail indicates an e-mail or a plurality of e-mails that have been one of transmitted and received through the communication device 108.

The types of the content objects A104 are differentiated by the types of the type display objects A102, which are lined up in a single direction. The content objects A104 are also arranged chronologically in another direction. In the case of the content object A104 described above that indicates e-mail, the content object A104 is displayed below the type display object A102 and is chronologically arranged in one of ascending and descending order by one of the transmission date and time and the receiving date and time. As shown in 104(A), the content objects A104 are arranged such that they are closed (or grouped) together in a single direction (for example, one of toward the top and toward the bottom). Displaying the content by the month, as in 104(A), makes it easy for the user to understand how many items of the content were processed in a certain month for each type of the content. It also makes it easy for the user to compare how many items of the content were used.

A day selection area A106 is also displayed in the overview display area A100 for selecting the content objects A104 by the day. The day selection area A106 may be displayed surrounded by a frame, as shown in 104(A), but the day selection area A106 may also be configured such that its display is highlighted by a method such as changing the display format of the content objects A104 or the like. The content objects A104 for the month where the day selection area A106 is positioned indicate a selected area within a month. In the example in 104(A), the content objects A104 for June are the selected area, and the content objects A104 for May and July are an unselected area A108. Further, within the selected area, the content objects A104 are processed such that each type of the content is grouped at one of the top and the bottom for each day. This makes it possible for the user to understand at a glance how many items of the content were processed on the day where the day selection area A106 is positioned.

The Detail Display Area A200

The numbers of the items of the content that are selected in the day selection area A106 in the overview display area A100 are displayed in the detail display area A200 by the type of the content. In the detail display area A200, type display objects A202 are displayed that indicate the types of the content. The numbers of the items of the content that correspond to the individual type display objects A202 are displayed in content quantity display areas A204 at the bottom of the detail display area A200. For example, as shown in 104(A), the content quantity display areas A204 display the numbers of the items of the content that were processed on one day over the numbers of the items of the content that were processed in the entire month.

The display configurations described above make it possible for the user to understand in terms of numerical values how many of the items of the content that have been processed, which the user understands in general terms based on the display in the overview display area A100. In other words, the display configurations make it possible for the user to acquire more precise information in incremental steps. Moreover, even in a case where a large number of the items of the content have been processed, such that some of the content objects A104 that exist are not displayed in the overview display area A100, the user can easily know the numbers of the items of the content that have been processed based on the information in the detail display area A200. Note that because the displays in the detail display area A200 are categorized by the type of the content, the user can easily compare the numbers of the items of the content that have been processed for each type.

Display by the Day

Next, the display configuration by the day, indicated by 104(B) in FIG. 2, will be explained. The basic concept of the display configuration by the day is the same as that of the display configuration by the month. It is also possible to switch between the display configuration by the month and the display configuration by the day.

The Overview Display Area A100

Figure 2:
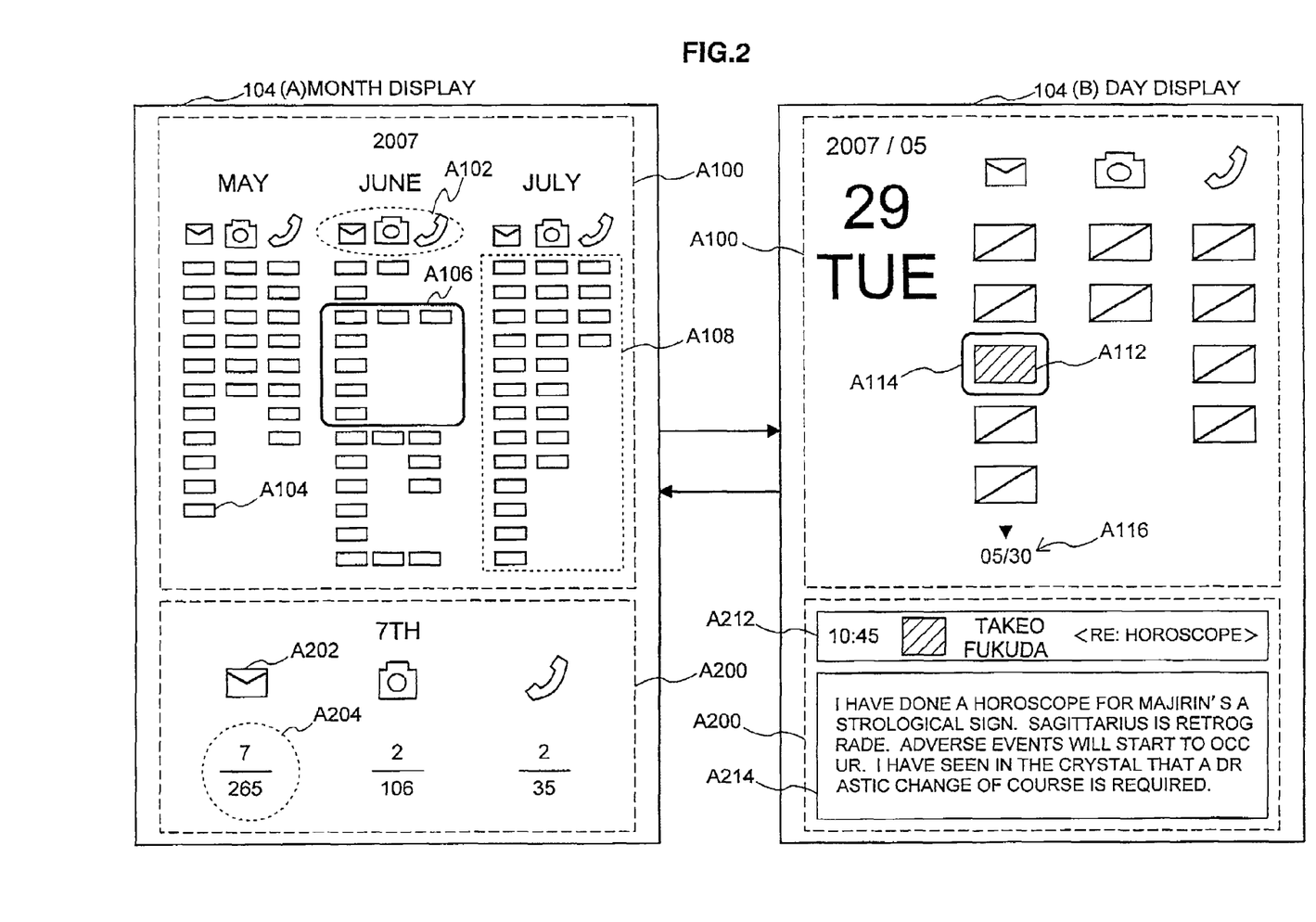
FIG. 2 is an explanatory figure that shows a configuration of a graphical user interface according to the embodiment.

As shown in 104(B) in FIG. 2, the content objects A104 that correspond to the content that was processed on a specified day are displayed in the overview display area A100. The display may be configured such that a photograph object A112 that corresponds to one of a person and a thing that is related to the content is displayed as the content object A104. For example, the photograph object A112 that is displayed as the content object A104 that is related to a received e-mail may be a photograph of the sender of the e-mail. The display may also be configured such that, in a case where the photograph object A112 is attached to a received e-mail, the attached photograph object A112 is displayed. The display may also be configured such that a specified photograph object A112 that is prepared in advance for each of the types of the content, for example, is displayed as the content object A104. Note that the photograph object A112 may also be a thumbnail, for example, that is displayed at a lower resolution than that of the original image.

A content selection area A114 for selecting an individual content object A104 is also displayed in the overview display area A100. In a case where content exists for at least one of a date that precedes and a date that follows the day that is currently displayed, a preceding/following date and time display area A116 is provided in the overview display area A100 to display at least one of the preceding date and the following date. This makes it possible for the user to switch to the graphical user interface that corresponds to the date for which the content exists. For example, if the content selection area A114 is moved to the lowest position for a certain type of the content, the date and time for which the next content of that type exists is displayed in the preceding/following date and time display area A116. Therefore, in some cases, the date and time displayed in the preceding/following date and time display area A116 will differ according to the type of the content.

Incidentally, in the display by the day, in the same manner as in the display by the month, the content objects A104 are displayed separately for each of the types of the content and are displayed such that they are grouped together in chronological order. This means that when the user compares the content objects A104 across the different types, the content objects A104 that are aligned in the horizontal direction are not necessarily associated with the same time.

The Detail Display Area A200

Detailed contents of the content that is selected in the content selection area A114 are displayed in the detail display area A200. For example, in a case where the content object A104 that is selected pertains to a received e-mail, within the detail display area A200, the header information for the received e-mail is displayed in a header information display area A212, and the content of the received e-mail is displayed in a content display area A214. For example, the e-mail receiving time, the sender's name, the title, the photograph object A212, and the like may be displayed in the header information display area A212.

The basic configurations of the graphical user interface according to the present embodiment have been explained. By using the display configurations described above, the user can compare the quantities of the items of the content that have been processed in a specified unit of time for a plurality of the types of the content. Furthermore, because the content objects A104 are displayed in groups along a chronological axis, the user can easily understand the total number of the items of the content that were processed will be a specified unit of time.

Note that commands for the processing that switches between the display by the day and the display by the month are issued by the hierarchical switching portion 116 in response to operations by the user. Further, commands for the processing that moves the day selection area A106 and the content selection area A114 are issued by the selection processing portion 118 in response to operations by the user. Control of the displays that are explained above is performed mainly by the display control portion 114 in response to an operation by the user.

Specific Display Configuration 1: Switching of the Display Format

Next, a configuration that switches the display format will be explained with reference to FIG. 3 as a specific example of the display configurations of the graphical user interface according to the present embodiment. The configuration is implemented mainly by a command that is issued by the display switching processing portion 120 in response to an operation by the user.

2D+3D Display Format

Figure 3:
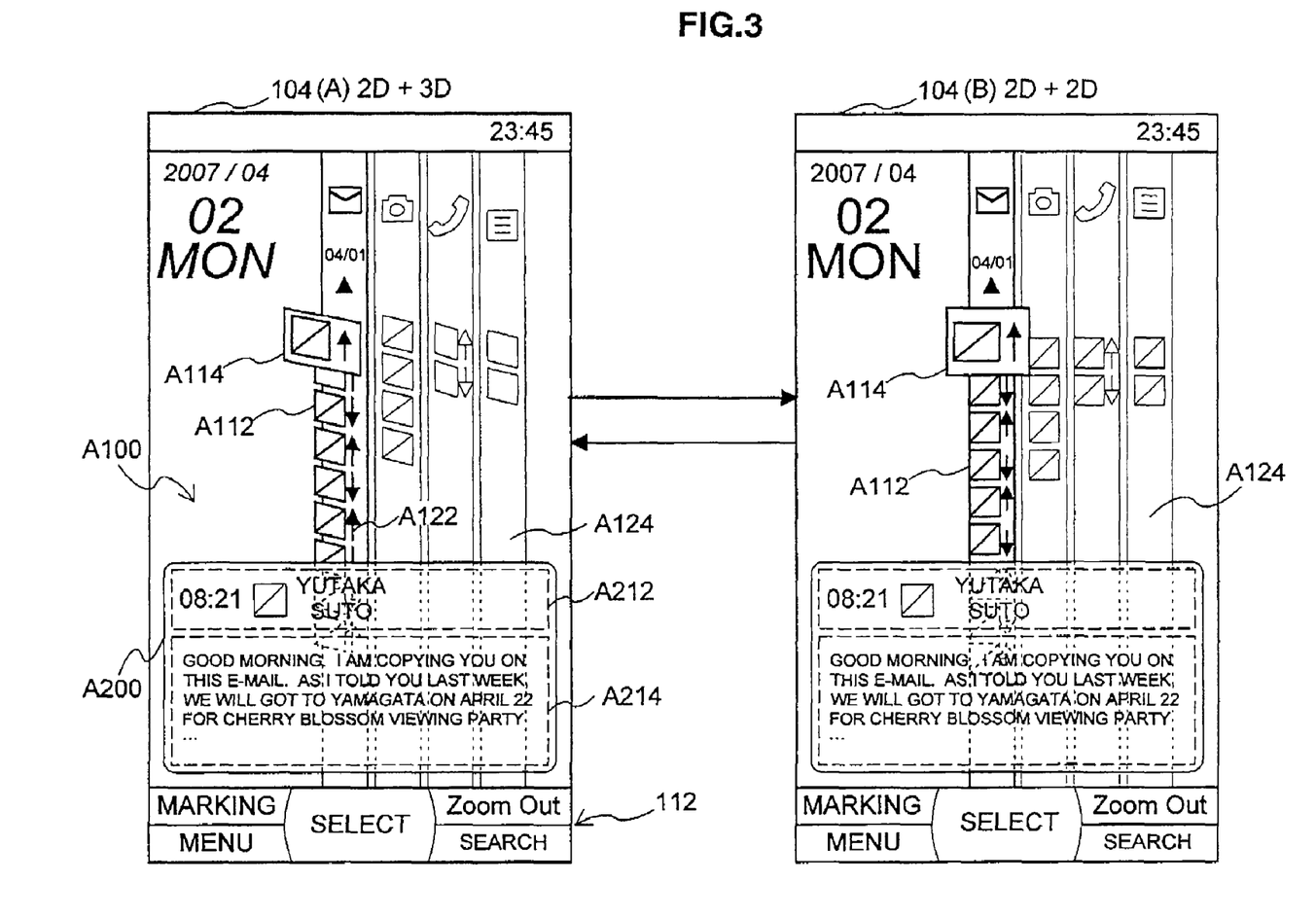
FIG. 3 is an explanatory figure that shows a configuration of the graphical user interface according to the embodiment.

104(A) in FIG. 3 is an explanatory figure of the graphical user interface with a display format in which the overview display area A100 is displayed three-dimensionally and the detail display area A200 is displayed two-dimensionally. Note that a directionality display object A122 that is displayed in 104(A) in FIG. 3 indicates a directionality of the content. For example, in a case where the content is an e-mail, the directionality display object A122 indicates, by the direction in which its arrow is pointing, whether the e-mail is one of a transmitted e-mail and a received e-mail. In a case where the content is a calling history, the directionality display object A122 indicates whether a call is one of outgoing and incoming. The display may also be configured such that the directionality display object A122 is displayed as the content that has directionality. Note that a content by type display area A124 is an area in which the content objects A104 are displayed by the type of the content.

In a case where the overview display area A100 and the detail display area A200 are displayed such that they overlap, as shown in FIG. 3, it may be difficult for the user to make out the information in the overlapped area.

Accordingly, the graphical user interface according to the present embodiment uses a display configuration in which the display format can be switched such that the display format of the overview display area A100 and the display format of the detail display area A200 differ from one another. For example, in the case shown in 104(A), the overview display area A100 is displayed three-dimensionally, and the detail display area A200 is displayed two-dimensionally. This makes it possible for the user to view the content that is displayed in the detail display area A200 while recognizing the position where the content selection area A114 is focused in the overview display area A100. This form of display is an effective display format for the graphical user interface in which the overview and the detail are displayed on the same screen. This sort of display format is suitable for a small display screen that is incorporated into a mobile terminal or the like, for example.

2D+2D Display Format

104(B) in FIG. 3 is an explanatory figure of the graphical user interface with a display format in which both the overview display area A100 and the detail display area A200 are displayed two-dimensionally.

As shown in 104(B) in FIG. 3, the overview display area A100 and the detail display area A200 can both be displayed in the same two-dimensional display format. However, if the two areas partially overlap, it will sometimes be difficult for the user to make out the information in the overlapped portion. On the other hand, if the overview display area A100 is displayed three-dimensionally as shown in 104(A), it will sometimes be difficult for the user to make out the content that is displayed in the overview display area A100, such as the photograph object A112 or the like, even if the user can recognize the position of the content selection area A114.

Accordingly, in the present embodiment, the graphical user interface that is provided is capable of switching between the two-dimensional display configuration and the three-dimensional display configuration. However, depending on the type of the content and the like, there are cases where it is not necessary for the user to recognize the nature of an object that is displayed in the overview display area A100. Therefore, in such cases, the display configuration in which the overview display area A100 is displayed three-dimensionally and the detail display area A200 is displayed two-dimensionally may be used in a fixed manner.

One of specific display configurations according to the present embodiment has been explained. Using the display configuration described above makes it easy for the user to make out the content even in a case where the overview display area A100 and the detail display area A200 are displayed such that they overlap.

Specific Display Configuration 2: Focused Search

Next, another specific display configuration of the graphical user interface according to the present embodiment will be explained with reference to FIG. 4. A display configuration that is used when a focused search is performed and a flow of the focused search processing will be explained. The search processing is mainly performed based on a command that is issued by the focused search processing portion 122 in response to an operation by the user.

Figure 4:
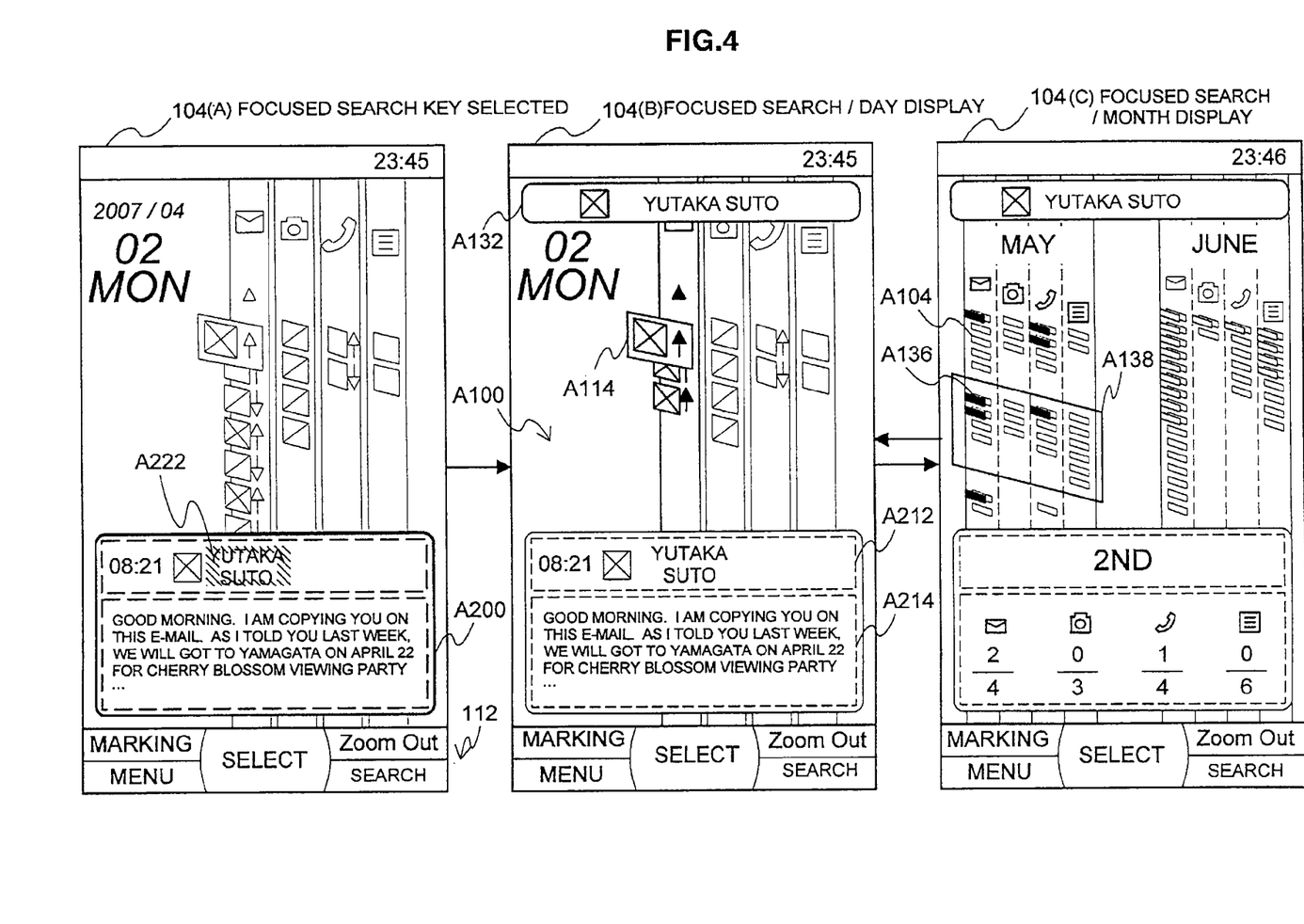
FIG. 4 is an explanatory figure that shows a configuration of the graphical user interface according to the embodiment.

First, as shown in 104(A) in FIG. 4, the user moves a key information selection area A222 to a specified item of the information that is displayed in the detail display area A200 and operates a focused search button (the operation portion 112). The operation of the focused search button causes the information that is contained in the key information selection area A222 to be selected as key information and causes the focused search to be performed.

Once the focused search is performed, the content objects A104 that correspond to the key information, among the content objects A104 that are displayed in the overview display area A100, are displayed as shown in 104(B). For example, in the column where the content selection area A114 is positioned, only the content objects A104 that correspond to the key information are displayed. For example, when the focused search is performed using the name of a sender of a received e-mail as the key information, the display is restricted to only the received e-mails that were sent by that sender. The key information is displayed in a key information display area A132.

The preceding explanation applies to a search that is performed in the display format by the day. However, in a case where a search is performed in the display format by the month, for example, a search result display object A136 is displayed in the position of the content objects A104 that correspond to the key information, as shown in 104(C). In addition, the numbers of the items of the content that were processed on the day on which a day selection area A138 is focused are displayed in the detail display area A200.

This makes it possible for the graphical user interface according to the present embodiment to display, in a manner that the user can easily recognize, the results of a focused search that uses as the key information a person's name, a title, or the like that is related to the content. In addition to a person's name and a title, the user can also select as the key information tag information such as time information, a subject, or the like, that is associated with the content. In the display format by the month, the quantities of the content that are displayed in the detail display area A200 may also be displayed along with the total amounts for all of the items of the content that were processed on the day on which the day selection area A138 is focused. Ratios in relation to the total amounts may also be displayed.

Specific Display Configuration 3: Marking

Next, another specific display configuration of the graphical user interface according to the present embodiment will be explained with reference to FIG. 5. A flow of processing that adds mark information to the content and a display configuration for information on the marked content will be explained. The marking processing is performed based on a command that is issued by the marking processing portion 124 issues in response to an operation by the user.

Figure 5:
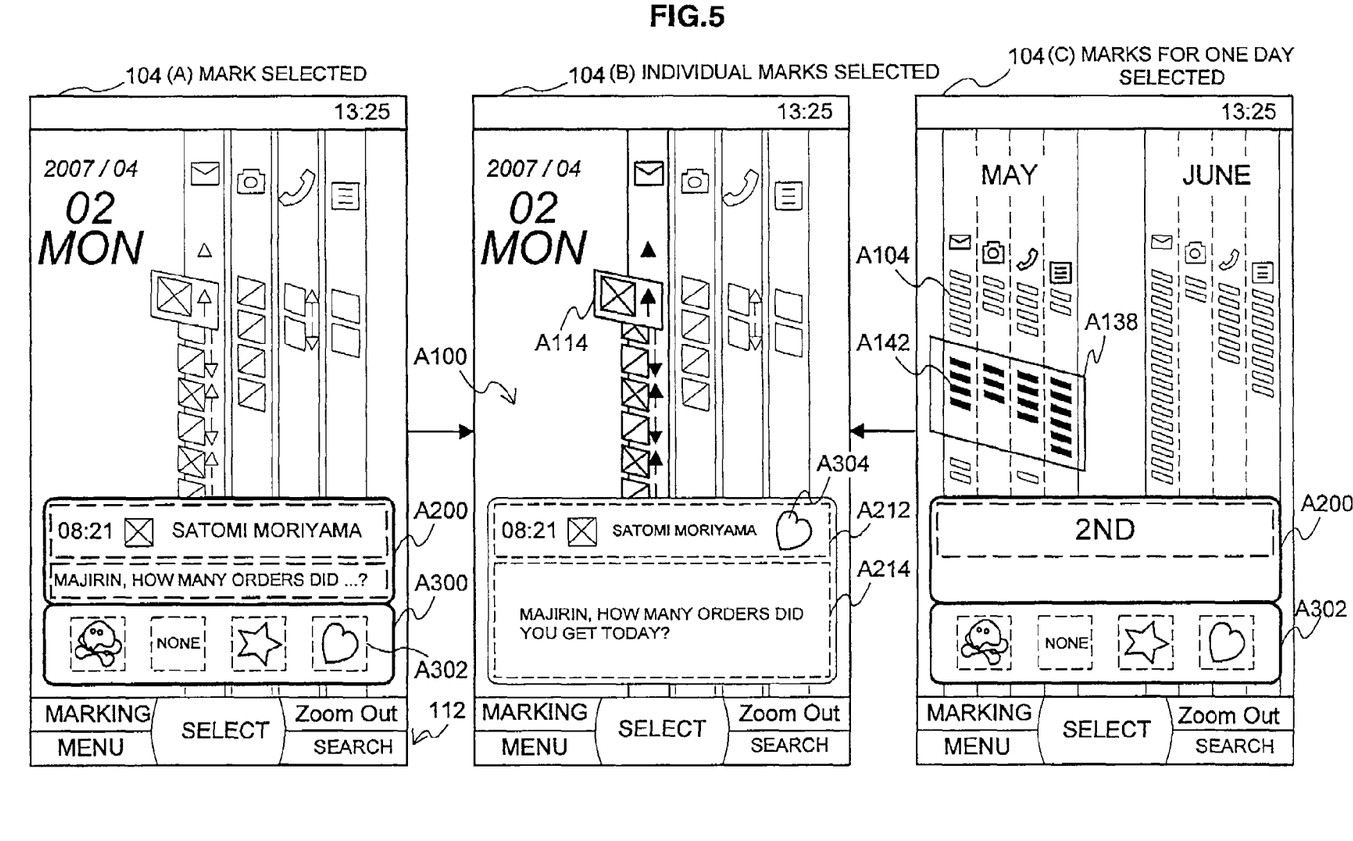
FIG. 5 is an explanatory figure that shows a configuration of the graphical user interface according to the embodiment.

First, when a marking button (the operation portion 112) is pressed, a mark information display area A300 is displayed as shown in 104(A) in FIG. 5. Mark object selection buttons A302 are displayed in the mark information display area A300. In a case where the user wants to mark the content that is displayed in the detail display area A200, the user presses the desired mark object selection button A302 to affix the mark information to the content. When the mark object selection button A302 is pressed, an affixed mark object A302 is displayed in the detail display area A200, as shown in 104(B), for example.

Furthermore, in the case of the display format by the month, as shown in 104(C), the user can affix the mark information at the same time to all of the content objects A104 that are contained within the day selection area A138. The content objects A104 to which the mark information is affixed are displayed as highlighted display objects A142 that are displayed in highlighted form. The highlighted display objects A142 are displayed in a display form that has at least one of a color and a shape that is different from the other content objects A104.

Once the mark information is affixed as described above, it becomes easy for the user to identify the content objects A104 to which the same mark information is affixed. It also becomes possible for the user to perform the focused search described above using the mark information as the key information. This makes it easy to extract only the specified content. Conversely, it also becomes possible for the user to mark the items of the content that are acquired by the focused search described above.

Examples of specific configurations of the graphical user interface according to the present embodiment have been explained. The configuration examples described above can also be used in combination with one another. For example, based on the results of the focused search, the display format of the overview display area A100 can be changed from two-dimensional to three-dimensional, and the display can be changed to a display like the highlighted display objects A142. Further, the display configuration of the graphical user interface according to the present embodiment is not restricted by the types of the content for which it is used. It is therefore possible to apply the technology of the present embodiment not only to content that can be handled by a currently known information processing terminal, but also to content that can be handled by an information processing terminal that is developed in the future.

Specific effects like those described below are expected from the display configurations described above. (1) Because the user can move directly among a plurality of the different types of the content, the user can complete a task without backtracking to a previous level and selecting the content anew. The user's effort is reduced accordingly. (2) Because the different types of the content are displayed in association with the chronological axis, it becomes possible for the user to extract the desired content based on the relatedness of the different types of the content, as in a case where the user wants to search for a photograph that was acquired on the day that an e-mail was transmitted, for example. (3) Because the different types of the content are displayed in different partitions based on a specified unit of time, the user can easily understand the amount of the content that was processed in the specified unit of time (one day, one month, or the like). (4) Because content other than the desired content is also present within the user's field of view, an effect is expected whereby the user is induced to view the other content, giving rise to a new awareness. (5) Because the graphical user interface is configured such that different forms of expression are used to make it possible to recognize the overlapping display areas as distinct things, it becomes possible to utilize a small display screen more efficiently. This increases the degree of freedom of the layout.

Hardware Configuration

Figure 6:
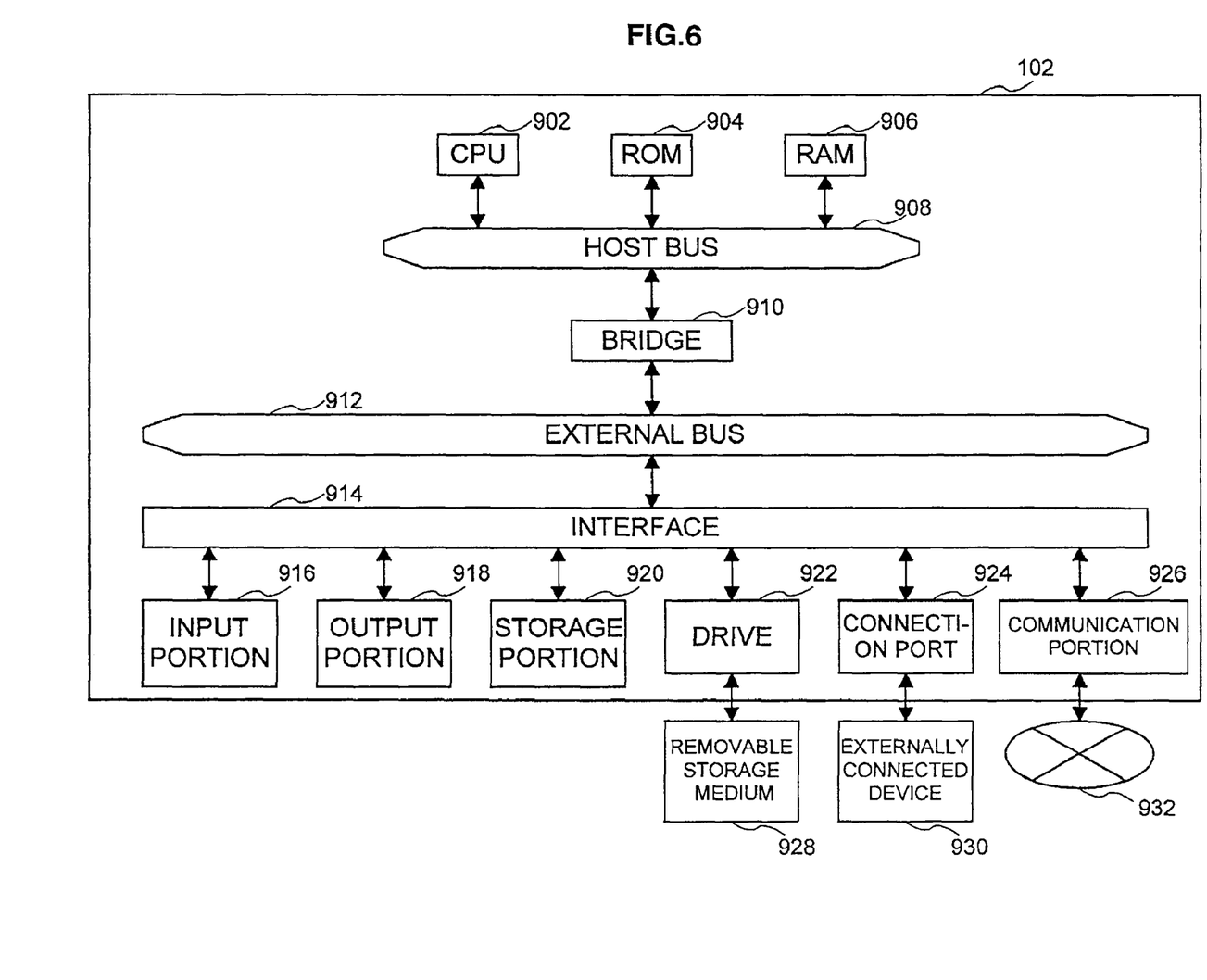
FIG. 6 is an explanatory figure that shows a hardware configuration of a display control device according to the embodiment.

The functions of the various configuring elements of the display control device 102 described above can be implemented in an information processing device that has a hardware configuration like that shown in FIG. 6. FIG. 6 is an explanatory figure that shows a hardware configuration of an information processing device that can implement the functions of the various configuring elements of the display control device 102.

As shown in FIG. 6, the information processing device mainly includes a central processing unit (CPU) 902, a read only memory (ROM) 904, a random access memory (RAM) 906, a host bus 908, a bridge 910, an external bus 912, an interface 914, an input portion 916, an output portion 918, a storage portion 920, a drive 922, a connection port 924, and a communication portion 926.

The CPU 902 functions as at least one of a computation processing device and a control device, for example, and controls one of all or a part of the operations of the various configuring elements, based on various types of programs that are stored in at least one of the ROM 904, the RAM 906, the storage portion 920, and a removable storage medium 928. The ROM 904 stores data and the like that are used by computations and by programs that are read by the CPU 902, for example. The RAM 906 stores, at least one of temporarily and permanently, the programs that are read by the CPU 902, as well as various types of parameters and the like that vary as necessary when the programs are executed, for example. These configuring elements are interconnected by the host bus 908, for example, which is capable of high speed data transmission. The host bus 908 is connected through the bridge 910 to the external bus 912, whose data transmission speed is comparatively low.

The input portion 916 is an operation portion such as a mouse, a keyboard, a touch panel, a button, a switch, a lever, or the like, for example. The input portion 916 may also be a remote control portion (what is called a remote control) that is capable of transmitting a control signal using infrared light or another electromagnetic wave. The input portion 916 also includes an input control circuit for transmitting to the CPU 902, as an input signal, information that is input using the operation portion described above.

The output portion 918 is a device that is capable of at least one of visibly and audibly notifying a user of information that has been obtained. The output portion 918 may be, for example, a display device, such as a cathode ray tube (CRT), a liquid crystal display (LCD), a plasma display panel (PDP), an electro-luminescence display (ELD), or the like, an audio output device such as a speaker, a headphone, or the like, a printer, a mobile telephone, a facsimile machine, or the like.

The storage portion 920 is a device for storing various types of data. The storage portion 920 may be configured from a magnetic storage device such as a hard disk drive (HDD) or the like, a semiconductor storage device, an optical storage device, a magneto optical storage device, or the like, for example.

The drive 922 is a device that at least one of reads information from and writes information to the removable storage medium 928, which is a magnetic disk, an optical disk, a magneto optical disk, a semiconductor memory, or the like, for example. The removable storage medium 928 may be a DVD medium, a Blu-ray medium, an HD DVD medium, a Compact Flash (CF) card, a memory stick, a Secure Digital (SD) memory card, or the like, for example. Of course, the removable storage medium 928 may also be an electronic device, an integrated circuit (IC) card that carries a non-contact IC chip, or the like.

The connection port 924 is a port such as a Universal Serial Bus (USB) port, an IEEE 1394 port, a Small Computer System Interface (SCSI) port, an RS-232C port, or the like for connecting to an externally connected device 930. The externally connected device 930 may be a printer, a portable music player, a digital camera, a digital video camera, an IC recorder, or the like, for example.

The communication portion 926 is a communication device for connecting to a network 932 and may be, for example, a communication card for a wired or wireless local area network (LAN), for Bluetooth®, or for Wireless USB, a router for optical communication, a router for an Asymmetric Digital Subscriber Line (ADSL), a modem for various types of communication, or the like. The network 932 to which the communication portion 926 is connected is a network that is connected by wire or wirelessly and may be, for example, the Internet, a home LAN, an infrared communication network, a broadcast network, a satellite communication network, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A graphical user interface that is displayed within one screen of a display device, comprising:
   a matrix-shaped display area that is partitioned along a first axis by types of content and partitioned along a second axis by units of time, the matrix-shaped display area displaying items of information on the content that are processed within a specified unit of time, closed together along the second axis; and
   a detail display area that either partially overlaps or entirely overlaps the matrix-shaped display area and in which detailed information is displayed with respect to the content that is selected within the matrix-shaped display area, the detail display area displaying comparatively detailed information including an icon for each type of content and a respective quantity display area for each icon, the quantity display area displaying a number of items that were processed during a time period that corresponds to the content that is selected within the matrix-shaped display area.

2. The graphical user interface according to claim 1, wherein the matrix-shaped display area and the detail display area are displayed in different display formats, such that the matrix-shaped display area and the detail display area can be visually differentiated and recognized.

3. The graphical user interface according to claim 2, wherein the matrix-shaped display area is displayed in a three-dimensional display format, and the detail display area is displayed in a two-dimensional display format.

4. The graphical user interface according to claim 1, wherein information is displayed mainly in the matrix-shaped display area for the content that corresponds to specified key information in a case where the specified key information is selected from within the comparatively detailed information that is displayed in the detail display area.

5. The graphical user interface according to claim 1, wherein information is displayed in a highlighted form in the matrix-shaped display area for the content that corresponds to specified key information in a case where the specified key information is selected from within the comparatively detailed information that is displayed in the detail display area.

6. The graphical user interface according to claim 5, wherein numbers of items of the content that corresponds to specified key information are displayed in the detail display area, partitioned by the types of the content, in a case where the specified key information is selected from within the comparatively detailed information that is displayed in the detail display area.

7. The graphical user interface according to claim 1, further comprising:
   a mark information display area in which is displayed a specified mark information item that is affixed to the information on the content,
   wherein
   the mark information item that is displayed in the mark information display area is selected and is affixed to an item of the comparatively detailed information that is displayed in the detail display area, and
   only content information to which a mark information item is affixed that is the same as a mark information item that is selected from within the comparatively detailed information that is displayed in the detail display area is displayed in the matrix-shaped display area.

8. The graphical user interface according to claim 1, further comprising:
   a mark information display area in which is displayed a specified mark information item that is affixed to the information on the content, wherein
   the mark information item that is displayed in the mark information display area is selected and is affixed to an item of the comparatively detailed information that is displayed in the detail display area, and
   content information to which a mark information item is affixed that is the same as a mark information item that is selected from within the comparatively detailed information that is displayed in the detail display area is displayed in the matrix-shaped display area.

9. A display control device, comprising:
   a display control portion that displays a graphical user interface that is displayed within one screen of a display device and that includes a matrix-shaped display area that is partitioned along a first axis by types of content and partitioned along a second axis by units of time, the display control portion displaying,
   items of information on the content that are processed within a specified unit of time within the matrix-shaped display area, closed together along the second axis, and
   a detail display area that either partially overlaps or entirely overlaps the matrix-shaped display area and in which detailed information is displayed with respect to the content that is selected within the matrix-shaped display area, the detail display area displaying comparatively detailed information including an icon for each type of content and a respective quantity display area for each icon, the quantity display area displaying a number of items that were processed during a time period that corresponds to the content that is selected within the matrix-shaped display area.

10. A display method, comprising the steps of:
    displaying a graphical user interface that is displayed within one screen of a display device and that includes a matrix-shaped display area that is partitioned along a first axis by types of content and partitioned along a second axis by units of time,
    displaying items of information on the content that are processed within a specified unit of time within the matrix-shaped display area, closed together along the second axis, and
    displaying a detail display area that either partially overlaps or entirely overlaps the matrix-shaped display area and in which detailed information is displayed with respect to the content that is selected within the matrix-shaped display area, the detail display area displaying comparatively detailed information including an icon for each type of content and a respective quantity display area for each icon, the quantity display area displaying a number of items that were processed during a time period that corresponds to the content that is selected within the matrix-shaped display area.

11. A non-transitory computer readable medium having a computer program recorded thereon, the computer program configured to perform a method when executed on a computer, the method comprising the steps of:

displaying a graphical user interface that displayed within one screen of a display device and that includes a matrix-shaped display area that is partitioned along a first axis by types of content and partitioned along a second axis by units of time,     displaying items of information on the content that is are processed within a specified unit of time within the matrix-shaped display area, closed together along the second axis, and     displaying a detail display area that either partially overlaps or entirely overlaps the matrix-shaped display area and in which detailed information is displayed with respect to the content that is selected within the matrix-shaped display area, the detail display area displaying comparatively detailed information including an icon for each type of content and a respective quantity display area for each icon, the quantity display area displaying a number of items that were processed during a time period that corresponds to the content that is selected within the matrix-shaped display area.

\* \* \* \* \*